United States Patent
Fyke

(10) Patent No.: US 7,324,091 B2
(45) Date of Patent: Jan. 29, 2008

(54) HANDHELD ELECTRONIC DEVICE AND KEYBOARD HAVING MULTIPLE-FUNCTION KEYS

(75) Inventor: Steven Henry Fyke, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 694 days.

(21) Appl. No.: 10/785,633

(22) Filed: Feb. 24, 2004

(65) Prior Publication Data

US 2005/0184963 A1    Aug. 25, 2005

(51) Int. Cl.
*G09G 5/00*    (2006.01)
(52) U.S. Cl. .................. 345/168; 343/169; 343/172
(58) Field of Classification Search ......... 345/156–172
See application file for complete search history.

(56) References Cited

U.S. PATENT DOCUMENTS 6,204,848 B1 * 3/2001 Nowlan et al. ............. 715/810
2001/0003539 A1   6/2001 Hahm et al.
2003/0012368 A1 * 1/2003 Smallwood ............ 379/433.07

FOREIGN PATENT DOCUMENTS

GB    1484634 A    9/1977
WO    WO 9704472 A    2/1997

* cited by examiner

*Primary Examiner*—Vijay Shankar
(74) *Attorney, Agent, or Firm*—Brij K. Agarwal; Eckert Seamans Cherin & Mellott, LLC

(57) ABSTRACT

An improved handheld electronic device having an improved keyboard provides enhanced usability with fewer keys by enabling the keys to pivot slightly to provide multiple functions to the keys. The improved keyboard may, for example, include internal strips of conductive carbon that are disposed adjacent the keys and are electrically engageable with contacts on a printed circuit board. Specifically, when a key is pressed directly downward it collapses a single dome and connects together a set of primary contacts to provide a first function. When the key is pressed at the side thereof, the key pivots slightly, collapses the dome and connects together the primary contacts, and also engages a carbon strip with a pair of secondary contacts to connect together the secondary contacts, all of which provide a second function. The keyboard may be configured to be of a QWERTY configuration while using only a relatively small number of keys.

20 Claims, 7 Drawing Sheets

HANDHELD ELECTRONIC DEVICE AND KEYBOARD HAVING MULTIPLE-FUNCTION KEYS

BACKGROUND OF THE INVENTION

1. Field of the Invention

The invention relates generally to handheld electronic devices and, more particularly, to a keyboard for a handheld electronic device.

2. Background Information

Numerous types of handheld electronic devices are known. Examples of such handheld electronic devices include, for instance, personal data assistants (PDAs), handheld computers, two-way pagers, cellular telephones, and the like. Such handheld electronic devices are generally intended to be portable and thus must be relatively small. Many handheld electronic devices feature wireless communication capability, although many such handheld electronic devices are stand-alone. Since handheld electronic devices typically are portable, it is also desired that the form factor of the devices be sufficiently small and ergonomic that they can conveniently be transported with a belt clip, in a user's pocket, manually, or in a briefcase. Advancements in technology have permitted the form factor of such handheld electronic devices to be reduced while increasing their versatility and functionality, such as by increasing the number of functions provided by the device as well as increasing the number of software applications and the variety of their features. However, as the form factor of a handheld electronic device decreases and the number of functions provided by the device increases, the device potentially can become awkward and difficult to use. Thus, it is also desirable to improve the usability of a handheld electronic device as its form factor is reduced and its versatility is increased. Previous attempts to increase such usability have had limitations.

One such type of solution has involved the use of large numbers of keys which, when pressed in various combinations, would produce various functions. For instance, adjacent keys were depressed simultaneously to provide additional functions. In mobile electronics, keys oftentimes are operatively connected with metal or carbon coated poly domes that act as switches for the keys and that are collapsible and provide tactile feedback to a user when the domes are collapsed from a relaxed position to a deflected position. The simultaneous pressing of multiple keys to provide a given function thus oftentimes can result in the collapsing of multiple domes, which can result in a confusing and/or undesirable tactile feedback to a user. Other attempts at improving usability have involved decreasing the quantity of keys on a handheld device while increasing the number of functions each key is to serve. Such systems potentially can become cumbersome because the various functions of a given key may additionally require the pressing of a SHIFT key, an ALT key, or another key to provide the various functions. In such a circumstance, the required multiple key pushing requires multiple hand movements which interfere with user friendliness.

SUMMARY OF THE INVENTION

An improved handheld electronic device and keyboard in accordance with the invention meet these and other needs. An improved handheld electronic device having an improved keyboard provides enhanced usability with fewer keys by enabling the keys to pivot slightly to provide multiple functions to the keys. The improved keyboard may, for example, include internal strips of conductive carbon that are disposed adjacent the keys and are electrically engageable with contacts on a printed circuit board. Specifically, when a key is pressed directly downward it collapses a single dome and connects together a set of primary contacts to provide a first function. When the key is pressed at the side thereof, the key pivots slightly, collapses the dome and connects together the primary contacts, and also engages a carbon strip with a pair of secondary contacts to connect together the secondary contacts, all of which provide a second function. The keyboard may be configured to be of a QWERTY configuration while using only a relatively small number of keys.

Accordingly, an aspect of the invention is to provide an improved handheld electronic device and an improved keyboard that provide enhanced usability while employing a relatively small number of keys.

Another aspect of the invention is to provide an improved handheld electronic device and an improved keyboard having keys that each include multiple functions that are provided by pressing the key at one side thereof, at another side thereof, or in the center thereof.

Another aspect of the invention is to provide an improved handheld electronic device and an improved keyboard that provide both collapsible domes (or alternative switches providing tactile feedback) and conductive carbon strips (or alternative switches generally not providing tactile feedback), with collapsing of a dome providing a first function, and with collapsing of the dome and engaging a carbon strip providing a second function.

Another aspect of the invention is to provide an improved handheld electronic device and an improved keyboard that provide keys having multiple functions with a single press while providing a desirable tactile feedback of a single collapsing dome to the user.

Another aspect of the invention is to provide an improved handheld electronic device and an improved keyboard of a QWERTY configuration having a relatively small number of keys with multiple characters being provided on each key.

Another aspect of the invention is to provide an improved handheld electronic device and an improved keyboard having a plurality of multi-function keys, with each key being movable between an initial position and a plurality of terminal positions, and with the various terminal positions of the key and the various functions of the key corresponding with one another.

Another aspect of the invention is to provide an improved handheld device and an improved keyboard that enables a small form factor while still providing enhanced usability or user friendliness.

Another aspect of the invention is to provide an improved keyboard of the type that is structured to be incorporated into an electronic device, in which the general nature of the keyboard can be stated as including a printed circuit board, a primary conductor portion, a secondary conductor portion, and a number of keys. The printed circuit board has a plurality of electrical contacts. The primary conductor portion includes a number of primary conductors, with each one of said primary conductors being elastically deflectable between a relaxed position and a deflected position, and with each one of said primary conductors in the deflected position electrically connecting together a pair of the electrical contacts. The secondary conductor portion includes a number of secondary conductors, with each one of said secondary conductors being elastically deflectable between a relaxed position and a deflected position, and with each one of said secondary conductors in the deflected position electrically connecting together a pair of the electrical contacts. Each one of said keys is cooperable with a corresponding one of said primary conductors and at least a first corresponding one of said secondary conductors. The primary conductors and the secondary conductors are disposed between the printed circuit board and the keys. Each one of said keys is movable between an initial position, a first terminal position, and a second terminal position, with the key in the first terminal position deflecting the corresponding one of said primary conductors to its deflected position, and with the key in the second terminal position deflecting the corresponding one of said primary conductors and the at least a first corresponding one of said secondary conductors to their deflected positions.

Another aspect of the invention is to provide an improved handheld electronic device, the general nature of which can be stated as including a keyboard, a display positioned adjacent the keyboard, and a processor structured to receive inputs from the keyboard and to output to the display as a function of said inputs. The keyboard may include a printed circuit board, a primary conductor portion, a secondary conductor portion, and a number of keys. The printed circuit board has a plurality of electrical contacts. The primary conductor portion includes a number of primary conductors, with each one of said primary conductors being elastically deflectable between a relaxed position and a deflected position, and with each one of said primary conductors in the deflected position electrically connecting together a pair of the plurality of electrical contacts. The secondary conductor portion includes a number of secondary conductors, with each one of said secondary conductors being elastically deflectable between a relaxed position and a deflected position, and with each one of said secondary conductors in the deflected position electrically connecting together a pair of the plurality of electrical contacts. Each key is cooperable with a corresponding one of said primary conductors and at least a first corresponding one of said secondary conductors, and the primary conductors and the secondary conductors are disposed between the printed circuit board and the keys. Each one of said keys is movable between an initial position, a first terminal position, and a second terminal position, with the key in the first terminal position deflecting the corresponding one of said primary conductors to its deflected position, and with the key in the second terminal position deflecting the corresponding one of said primary conductors and the at least a first corresponding one of said secondary conductors to their deflected positions.

BRIEF DESCRIPTION OF THE DRAWINGS

A full understanding of the invention can be gained from the following Description of the Preferred Embodiment when read in conjunction with the accompanying drawings in which.

Similar numerals refer to similar parts throughout the specification.

DESCRIPTION OF THE PREFERRED EMBODIMENT

Figure 1:
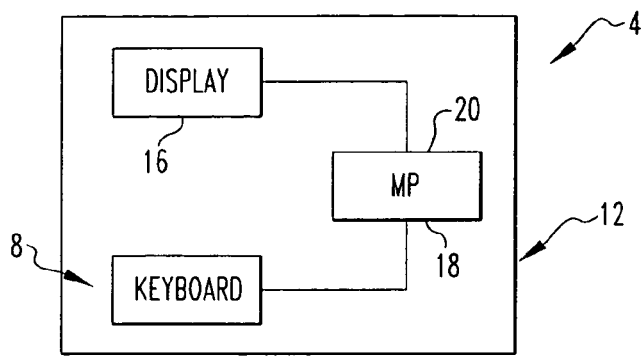
FIG. 1 is a block diagram of an improved handheld electronic device in accordance with the invention.

An improved handheld electronic device 4 in accordance with the invention is shown in FIG. 1. The handheld electronic device 4 includes an improved keyboard 8 in accordance with the invention that is depicted, in whole or in part, in FIGS. 2-11. More particularly, the handheld electronic device 4 includes the keyboard 8, a housing 12, a display 16, and a suitable processor 18 (e.g., without limitation, a microprocessor) having software 20 that resides in the handheld electronic device 4 and that provides functionality to inputs received from the keyboard 8 and provides outputs to the display 16. The keyboard 8 and the display 16 are disposed on the housing 12, and the operability of the software 20 is enabled by the processor 18. Examples of handheld electronic devices are included in U.S. Pat. Nos. 6,452,588 and 6,489,950, which are incorporated by reference herein.

Figure 2:
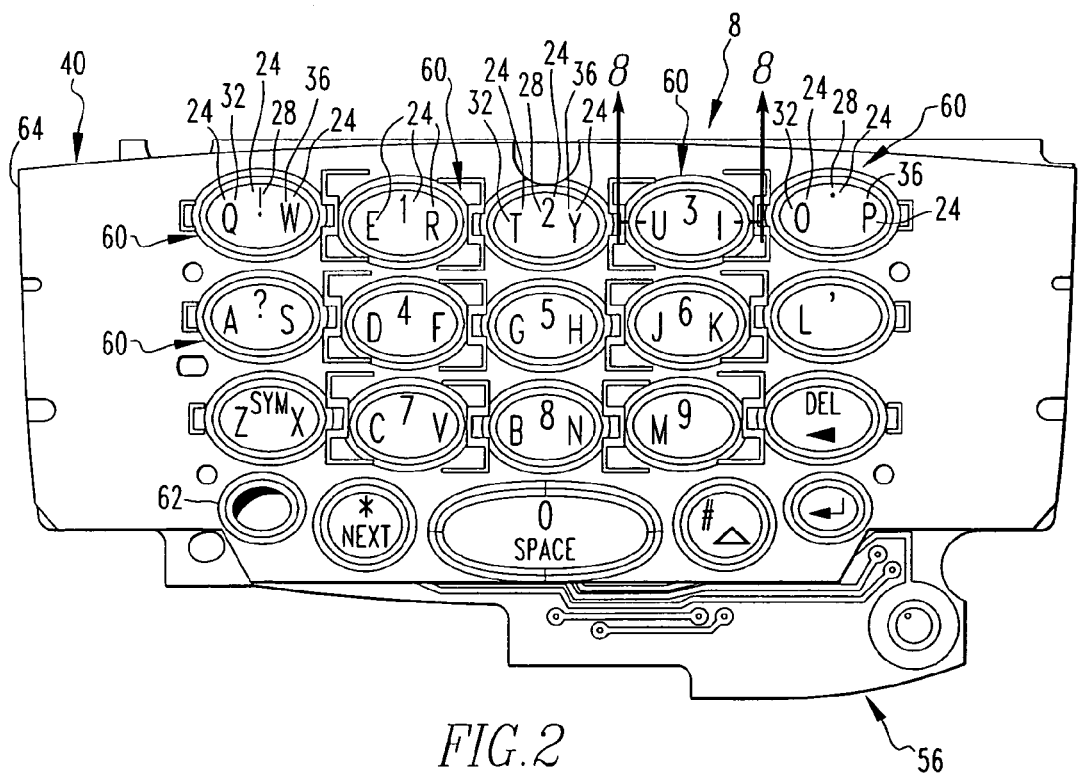
FIG. 2 is a top plan view of an improved keyboard in accordance with the invention.

As can be seen in FIG. 2, the exemplary keyboard 8 includes a plurality of keys 60, each of which includes a number of characters 24. As used herein, the expression "a number of" and variations thereof shall refer broadly to any non-zero positive quantity, including a quantity of one. The exemplary keys 60 depicted and described herein each include a first character 28 that is generally centrally disposed on the key 60, a second character 32 that is generally disposed at a left end (from the perspective of FIG. 2) of the key 60, and a third character 36 that is generally disposed at a right end (from the perspective of FIG. 2) of the key 60, with the first, second, and third characters 28, 32, and 36 being referable collectively, in whole or in part, by the aforementioned numeral 24.

As can further be seen in FIG. 2, many of the exemplary first characters 28 are digits, and many of the second and third characters 32 and 36, respectively, are letters. Also, many of the second and third characters 32 and 36, respectively, together are of a QWERTY configuration to provide a QWERTY key configuration for the handheld electronic device 4 of FIG. 1. It is understood, however, that the arrangement of the characters 24 can be different than the exemplary arrangement depicted in FIG. 2. For instance, the first, second, and third characters 28, 32, and 36, respectively, can together form a QWERTY arrangement. Alternately, the characters 24 could be numerical or mathematical symbols, could be characters of different languages, or could be of virtually any other character and/or keyboard configuration.

Figure 3:
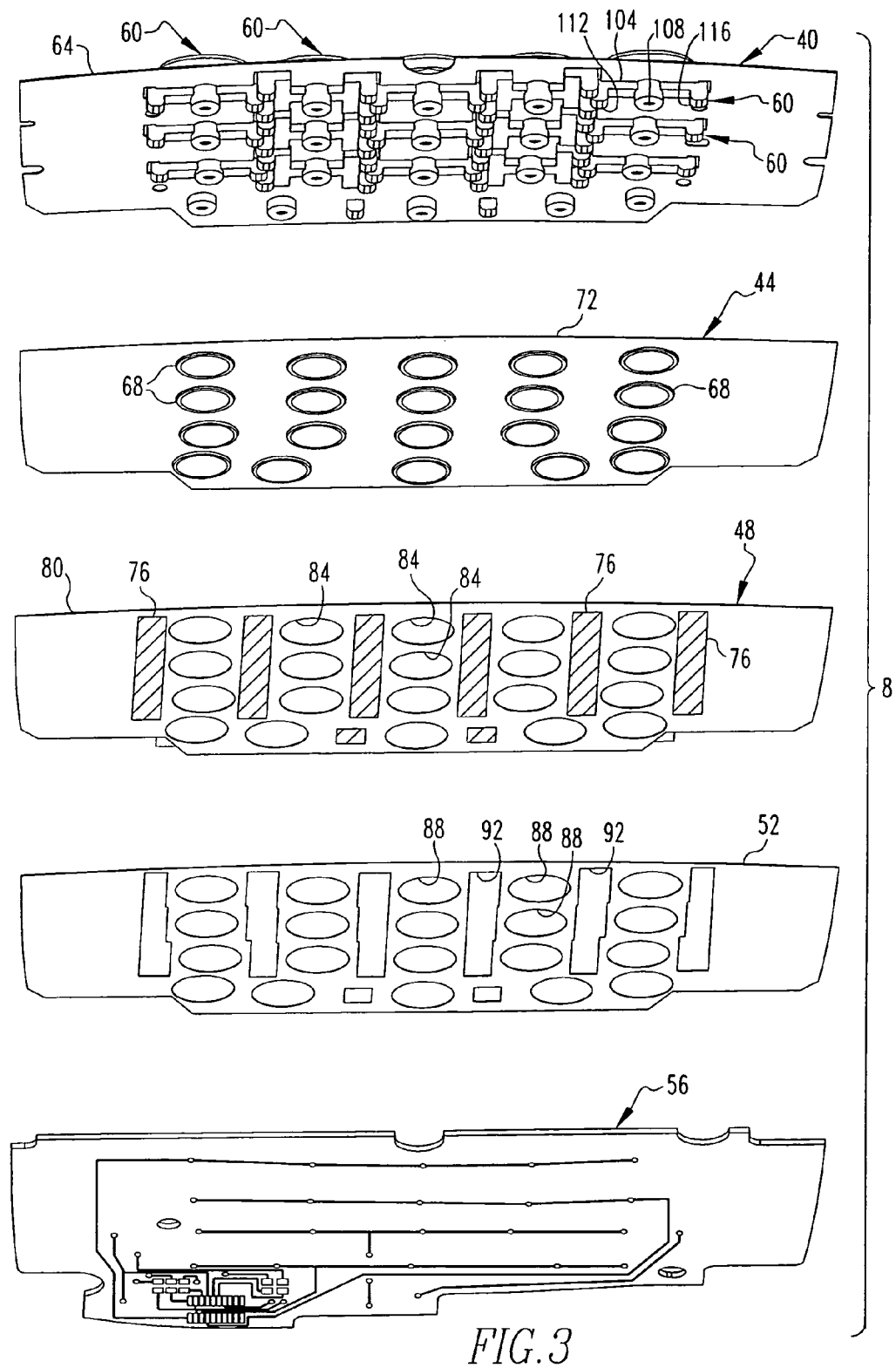
FIG. 3 is an exploded isometric view of the keyboard of FIG. 2.
Figure 4:
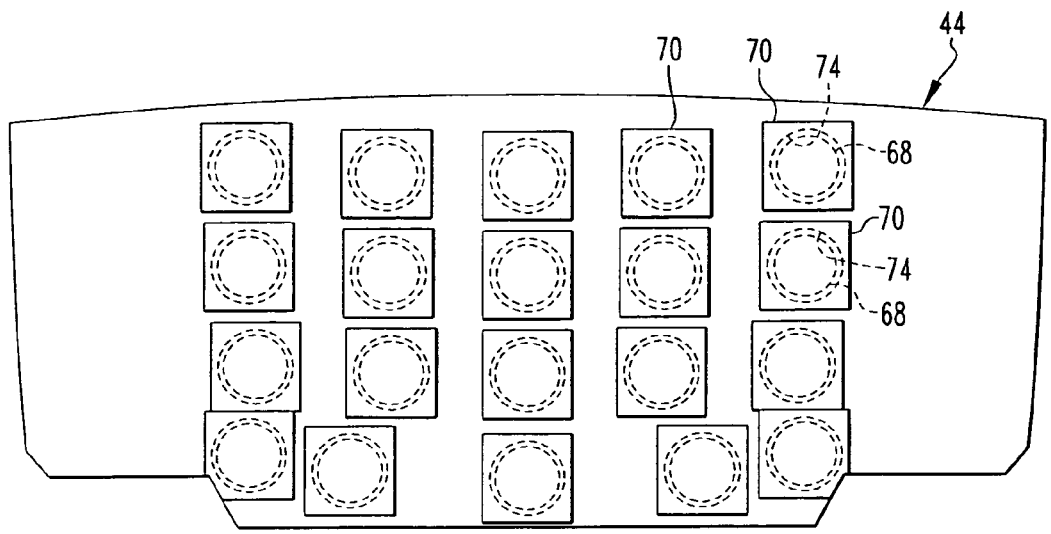
FIG. 4 is a top plan view of the primary conductor portion of the keyboard of FIG. 2.
Figure 5:
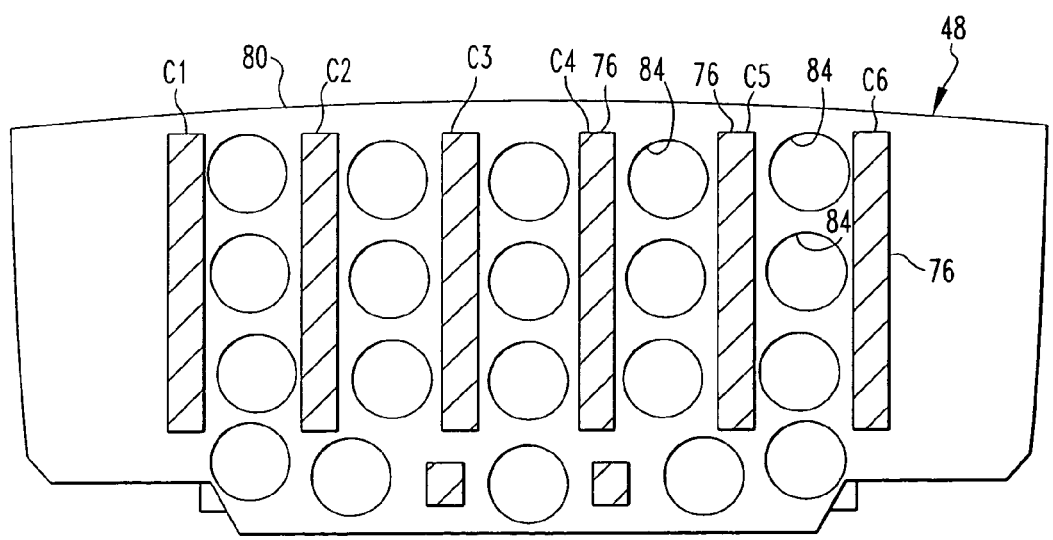
FIG. 5 is a top plan view of the secondary conductor portion of the keyboard of FIG. 2.

As can be best understood from FIG. 3, the keyboard 8 includes a keypad 40, a primary conductor portion 44, a secondary conductor portion 48 having a spacer 52, and a printed circuit board 56. The aforementioned components of the keyboard 8 can be adhered together or otherwise attached to one another, while in other embodiments the components need not be adhered to one another in any fashion.

The keypad 40 includes the aforementioned keys 60 and a key panel 64. The keys 60 are movably disposed on the key panel 64 and are permitted to pivot slightly with respect thereto.

The primary conductor portion 44 includes a plurality of conductive domes 68 disposed on a dome panel 72. The dome panel 72 includes a plurality of primary holes 74 (FIG. 8) formed therein and a plurality of flexible adhesive members 70 (FIG. 8) disposed on one surface of the dome panel 72 and positioned adjacent the primary holes 74. The domes 68 extend through the primary holes 74, and the apex of each dome 68, i.e., the proud portion thereof, is adhered to one of the adhesive members 70. The circular edge of each dome 68 opposite the apex thereof protrudes outwardly from and beyond the associated primary hole 74. While in the depicted exemplary embodiment the domes 68 are adhered to the dome panel 72 with the adhesive members 70, it is understood that in other embodiments the domes 68 and the dome panel 72 may be connected together in other fashions, or might not be connected together at all, without departing from the concept of the invention.

Figure 8:
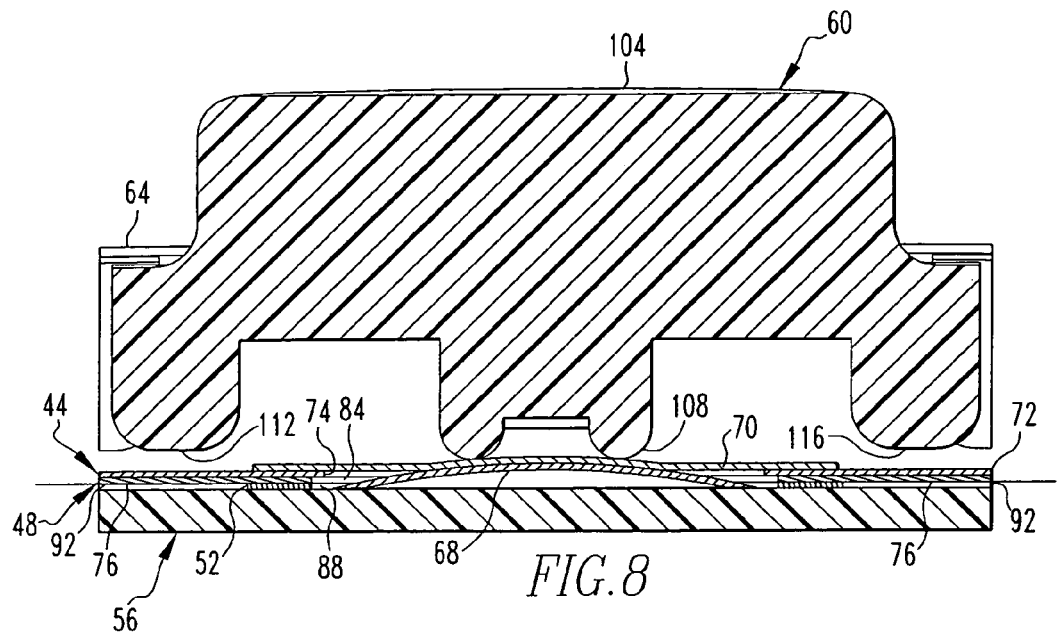
FIG. 8 is a sectional view as taken along Line 8-8 of FIG. 2 and depicting a key of the keyboard in an initial position.
Figure 9:
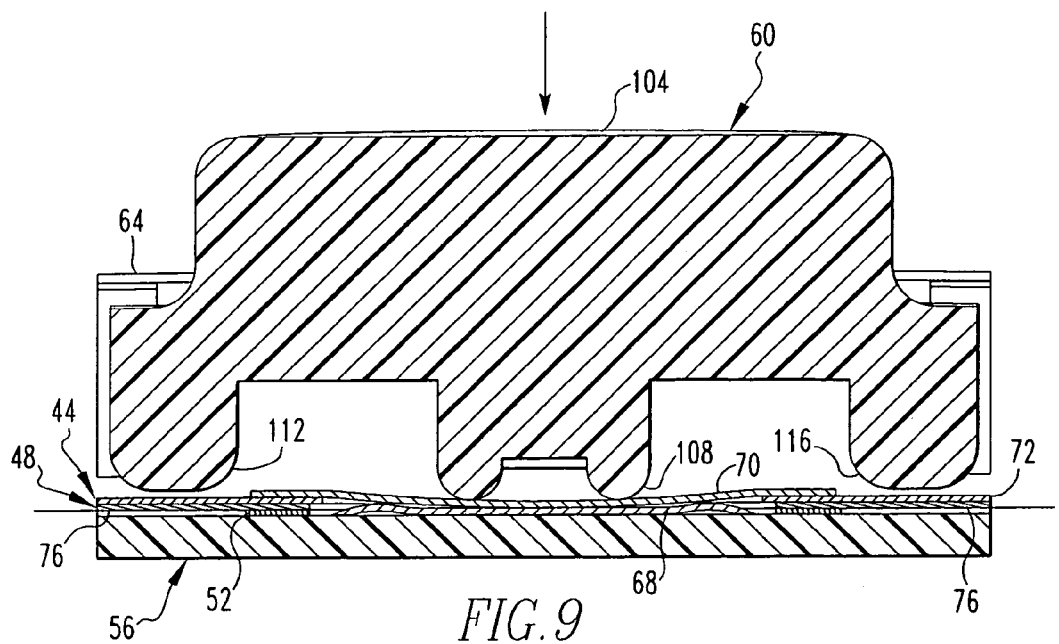
FIG. 9 is a view similar to FIG. 8, except depicting the key in the first terminal position.
Figure 10:
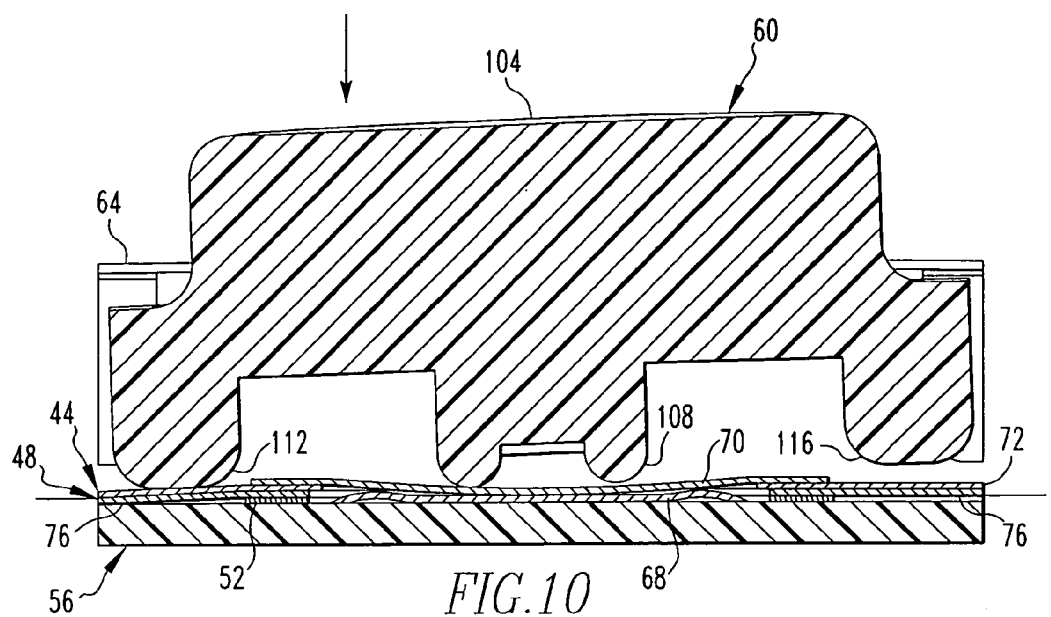
FIG. 10 is a view similar to FIG. 8, except depicting the key in the second terminal position.
Figure 11:
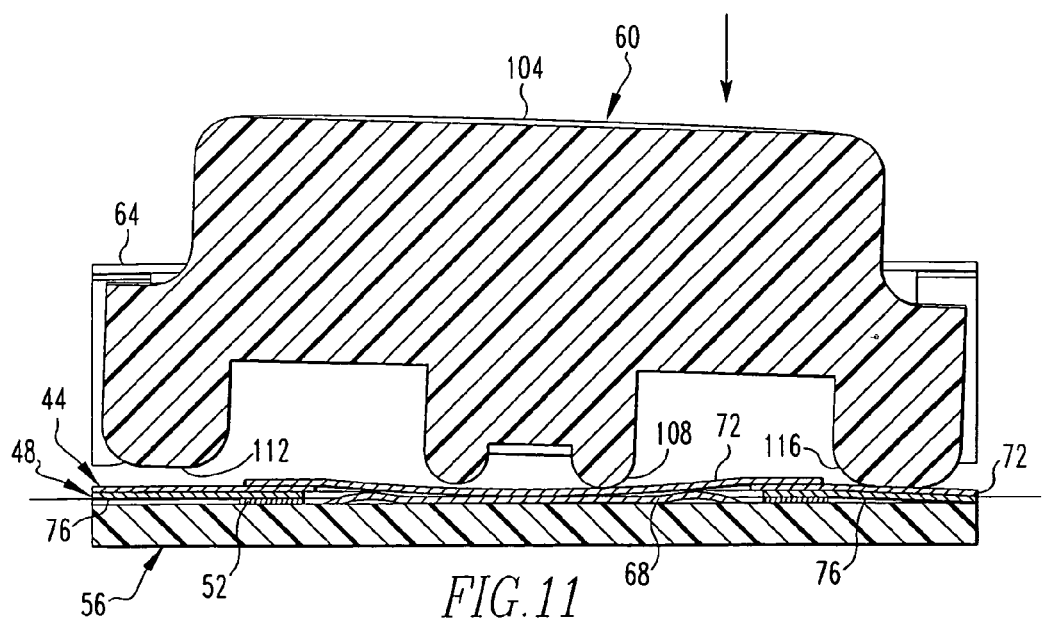
FIG. 11 is a view similar to FIG. 8, except depicting the key in the third terminal position.

The domes 68 are elastically deflectable between a relaxed position, i.e., FIG. 8, and a deflected position, i.e., FIGS. 9-11. The movement of the domes 68 between the relaxed and deflected positions occurs via elastic deformation of the domes 68 and causes the domes to "snap" between the relaxed and deflected conditions to provide a desirable tactile feedback.

The secondary conductor portion 48 includes a plurality of elongated conductive carbon strips 76 disposed on a flexible support sheet 80. The support sheet 80 includes a plurality of primary holes 84 formed therein between pairs of adjacent carbon strips 76. The primary holes 84 in the support sheet 80 are arranged to correspond with and be similar to the arrangement of the primary holes 74 in the dome panel 72. It is understood that in other embodiments the secondary conductor portion 48 could have elongated strips of a different conductive material, such as a metal or other material, without departing from the concept of the invention. The support sheet 80 may be a thin plastic sheet, although other configurations are possible.

It is understood that the primary conductor portion 44 and the secondary conductor portion 48 can be said to provide switches for the keys 60. Such switches of the primary conductor portion 44 provide a tactile feedback, and such switches of the secondary conductor portion 48 generally do not provide tactile feedback, but such switches could be of other configurations.

The spacer 52 is a sheet of material that can be generally said to space the carbon strips 76 away from the printed circuit board 56. The spacer 52 includes a plurality of circular primary holes 88 arranged in rows similar to the arrangement of the primary holes 84 in the support sheet 80 and the primary holes 74 in the dome panel 72. The spacer 52 additionally includes a plurality of elongated secondary holes 92 that correspond generally with the arrangement of the carbon strips 76 on the support sheet 80. In the exemplary embodiment, the spacer 52 is a thin sheet of an insulative material, such as plastic, although configurations are possible. It is also understood that the keyboard 8 potentially could be configured in other fashions that would eliminate the need for the spacer 52 but would still be considered to be within the scope of the invention.

Figure 7:
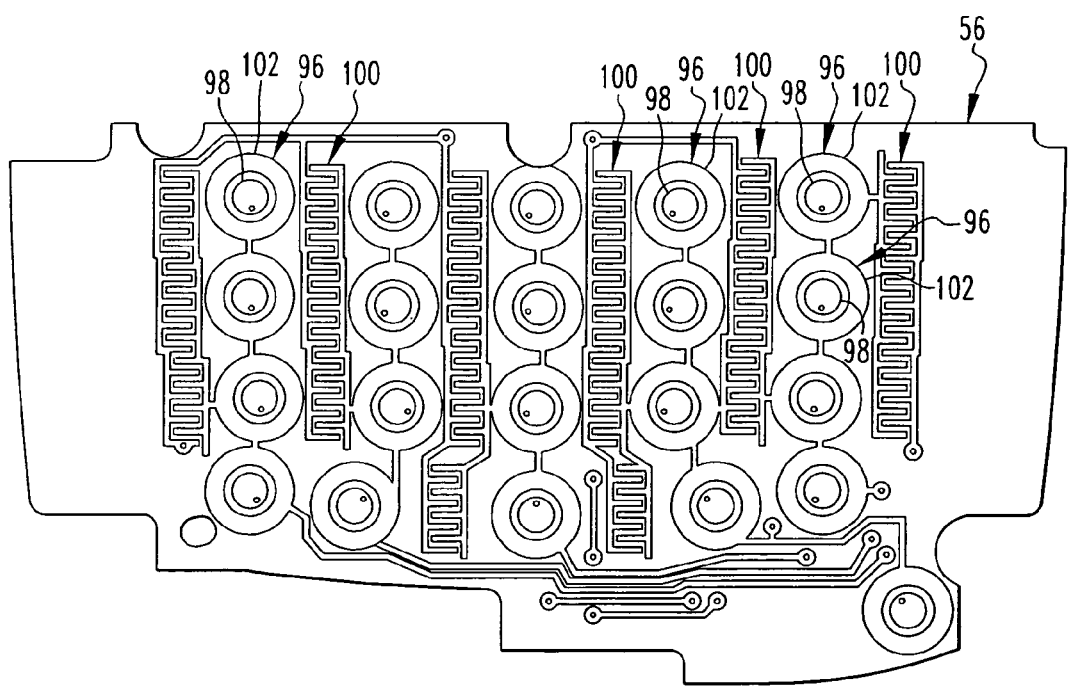
FIG. 7 is a top plan view of the printed circuit board of the keyboard of FIG. 2.
Figure 7A:
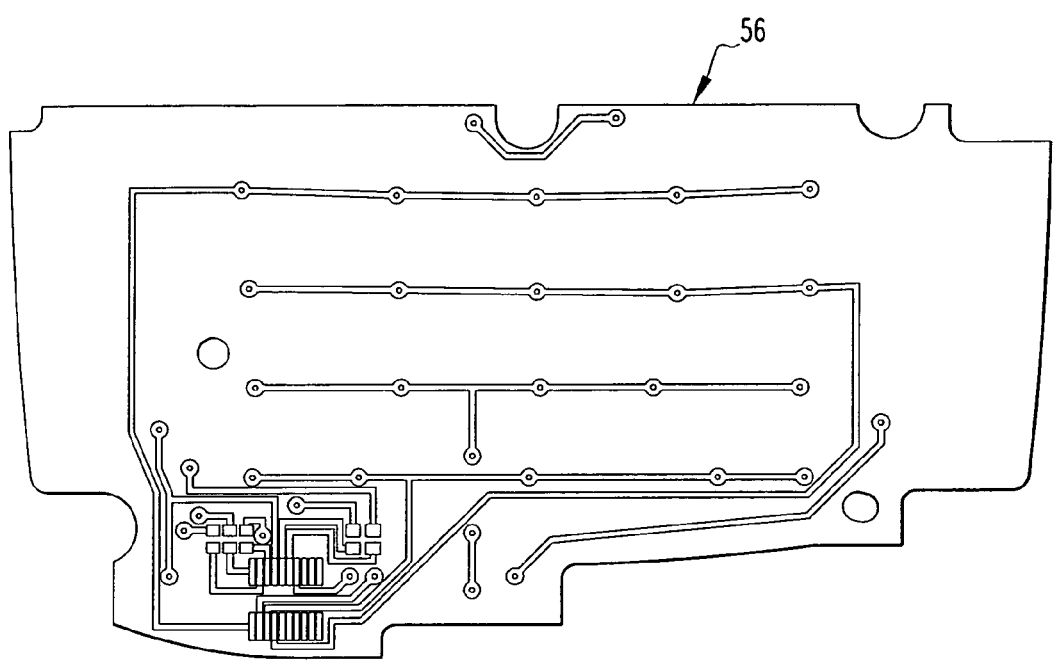
FIG. 7A is a bottom plan view of the printed circuit board of the keyboard of FIG. 2.

As is best shown in FIG. 7, the printed circuit board 56 includes a plurality of primary contacts 96 and a plurality of secondary contacts 100. The primary and secondary contacts 96 and 100, respectively, are electrically conductive electrical contacts which, when connected with one another, such as with a conductor extending therebetween, completes a circuit or completes an open portion of a circuit. The primary contacts 96 are, in the depicted exemplary embodiment, arranged in pairs and specifically include a ball contact 98 and a ring contact 102, with the ring contact 102 extending concentrically about the ball contact 98.

The domes 68 (FIG. 8) each also extend through an aligned pair of the primary holes 84 and 88 formed in the support sheet 80 and the spacer 52, respectively. The circular ends of the domes 68 rest on the ring contacts 102 of the primary contacts 96.

The secondary contacts 100 are arranged in pairs and are generally of an "intermeshed comb" arrangement. In the exemplary embodiment of the printed circuit board 56 depicted in FIG. 7 and described herein, certain of the primary contacts 96 are electrically connected with leads to certain of the secondary contacts 100, and numerous other contact configurations are possible without departing from the concept of the invention.

As can be understood from FIGS. 8-11, each key 60 includes a finger plate 104, a first protrusion 108 in the exemplary form of a hollow cylinder, a second protrusion 112, and a third protrusion 116. The finger plate 104 is engageable by a user's finger and includes the characters 24 (FIG. 2) disposed thereon. The first, second, and third protrusions 108, 112, and 116, respectively, extend outwardly away from the finger plate 104 in a common direction which, in the exemplary embodiment, is opposite the characters 24. In the exemplary key 60 of FIGS. 8-11, the free ends of the first, second, and third protrusions 108, 112, and 116, respectively, do not lie within a plane and may be of configurations other than that depicted herein depending upon the configuration of the other components of the keyboard 8.

As can further be understood from FIG. 8, each key 60 is associated with one of the domes 68 and with a pair of the carbon strips 76 (FIG. 3). In FIG. 8, the key 60 is in an initial position which corresponds with the relaxed position of the associated dome 68 and the relaxed positions of the associated carbon strips 76. When the key 60 is depressed straight toward the printed circuit board 56, such as is depicted generally in FIG. 9, and which would correspond with a user pressing the key 60 at the first character 28 (FIG. 2), the first protrusion 108 of the key 60 engages the dome 68 that is associated with the key 60 and elastically collapses the dome 68 to the deflected position, while the carbon strips 76 associated the dome 68 remain in their relaxed positions. The key 60 in FIG. 9 is in the first terminal position, and thus it can be seen that the key 60 is movable between the initial position and the first terminal position.

When the dome 68 is in the deflected position, it contacts the ball contact 98 of the associated pair of primary contacts 96. The domes 68 are primary conductors which, when engaged with a corresponding set of primary contacts 96, electrically connect together the pair of primary contacts 96 in order to complete a circuit or to complete an open portion of a circuit, which provides a first function associated with the first terminal position of the key 60. The dome 68 is configured to "snap" when moving between the relaxed position (FIG. 8) and the deflected position (FIG. 9), and such a "snap" provides a desirable tactile feedback to the user.

As can be understood from FIGS. 10 and 11, the key 60 is also movable between the initial position and the second terminal position, i.e., FIG. 10, that would correspond with a user pressing the second character 32 (FIG. 2), which provides the key 60 with a second function associated with the second terminal position of the key 60. The key 60 is also movable between the initial position and the third terminal position, i.e., FIG. 11, which would correspond with a user pressing the third character 36 (FIG. 2) of the key 60 to provide the key with a third function associated with the third terminal position of the key 60.

When the key 60 is in the second terminal position, i.e., FIG. 10, the associated dome 68 is in its deflected position, and one of the carbon strips 76 associated with the key 60 is also in its deflected condition. When the key 60 is in the third terminal position, i.e., FIG. 11, the associated dome 68 is in its deflected position, and the other of the carbon strips 76 associated with the key 60 is also in its deflected condition. Each carbon strip 76 serves as a secondary conductor that is engageable with a pair of the secondary contacts 100 for the purpose of electrically connecting together the pair of secondary contacts 100 to complete a circuit or to complete an open portion of a circuit.

Figure 6:
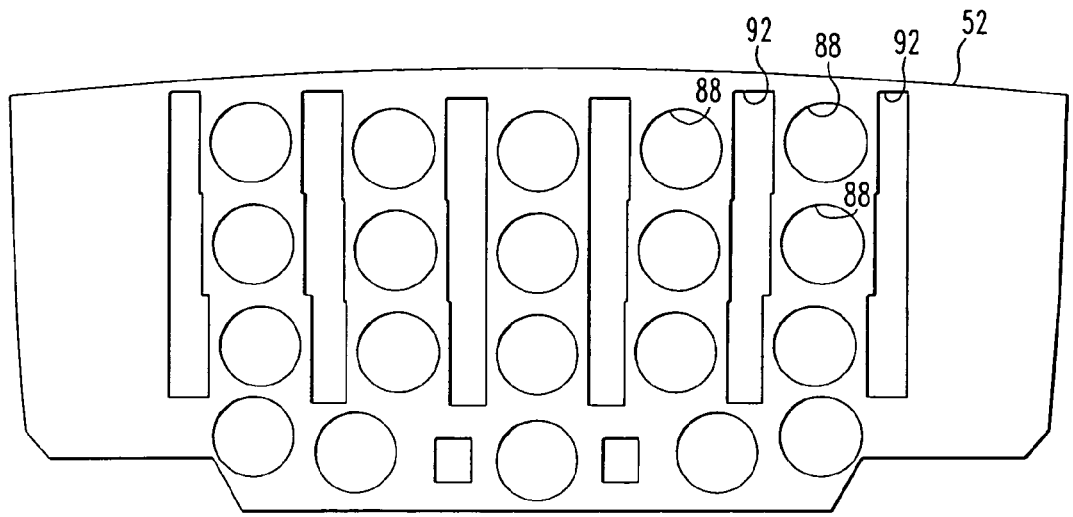
FIG. 6 is a top plan view of the spacer of the keyboard of FIG. 2.

The carbon strips 76 are mounted on the support sheet 80 (FIG. 5), which is flexible, and which permits elastic deflection of the carbon strips 76 between a relaxed position (FIG. 8) and the aforementioned deflected position (FIGS. 10 and 11). The carbon strips 76 in the deflected position extend through the associated secondary holes 92 in the spacer 52 (FIG. 6). In the exemplary embodiment depicted herein the carbon strips 76 do not "snap" or otherwise proved a discrete tactile feedback to the user. Some feedback to the user is acceptable, however, such as the slight additional finger force required to elastically deflect the carbon strips 76 between the relaxed and deflected positions. In other embodiments, the carbon strips 76 can be configured to provide specific tactile feedback to the user in moving between the relaxed and deflected positions without departing from the concept of the invention.

The key 60 in the second terminal position is pivoted slightly in a direction away from the first terminal position. In the exemplary embodiment depicted herein, the second terminal position, i.e., FIG. 10, is pivoted in a counter-clockwise direction from the first terminal position, i.e., FIG. 9, from the perspective of FIGS. 9 and 11.

When the key 60 is in the third terminal position, as is depicted in FIG. 11, the associated dome 68 is in the deflected condition, and the other associated carbon strip 76 is deflected from its relaxed position to its deflected position. The key 60 in the third terminal position is pivoted in a different direction away from the first terminal position, which direction in the depicted embodiment is a clockwise direction from the first terminal position, i.e., FIG. 9, from the perspective of FIGS. 9 and 11.

When the carbon strips 76 are moved to their deflected positions, which alternately occur at the second and third terminal positions of the key 60, the deflected carbon strip 76 engages an associated pair of the secondary contacts 100 and, being a conductor, electrically connects together the pair of secondary contacts 100. In the embodiment depicted herein, a given pair of the secondary contacts 100 extends along the printed circuit board 56 adjacent a plurality of the pairs of primary contacts 96 and, in the depicted embodiment, the primary contacts 96 of some of the pairs of the primary contacts 96 lie on opposite sides of the given set of secondary contacts 100. Since, in the depicted exemplary embodiment, a single pair of the secondary contacts 100 extends past a plurality of pairs of the primary contacts 96, the single set of secondary contacts 100 serves as the associated secondary contacts 100 for all of the keys 60 with which the adjacent pairs of primary contacts 96 are associated.

It thus can be seen that each key 60 is movable between the initial position and a plurality of terminal positions, i.e., the first, second, and third terminal positions, depicted in FIGS. 9-11, respectively. The three terminal positions are associated with the three characters 24 (FIG. 2) on the keys 60, and the various engagements of the domes 68 and the carbon strips 76 provide various inputs to the handheld electronic device 4 and to which the processor 18 and the software 20 provide functionality.

EXAMPLES

An keying chart is provided in Table 1. The vertical column Key Out refers to five outputs from the processor 18 to the keyboard 8 which are normally set to HIGH. Key In refers to eight inputs to the processor 18 from the keyboard 8 which are normally set to LOW. The numerals C1, C2, C3, C4, C5, and C6 (FIG. 5) refer to the exemplary six carbon strips 76 identified from left to right from the perspective of FIG. 5.

TABLE 1

| Key OUT | Key IN | | | | | | | |
|---|---|---|---|---|---|---|---|---|
| | 0 | 1 | 2 | 3 | 4 | 5 | 6 | 7 |
| 0 | QW | AS | ZX | ALT | C1 | | | |
| 1 | ER | DF | CV | NEXT | C2 | | | |
| 2 | TY | GH | BN | <SPACE> | C3 | | | |
| 3 | UI | JK | M | CAP | C4 | | | |
| 4 | OP | L | <Backspace> | <ENTER> | C5 | C6 | | |

The processor 18 scans the Key Out outputs and scans the Key In inputs to detect changes of state. For instance, if the QW key is pressed to the third terminal position, the dome that corresponds with the QW key would electrically connect the corresponding primary contacts 96, and the C2 carbon strip (FIG. 5) would electrically connect the corresponding secondary contacts 100. From the collapsing of the QW dome, the processor 18 would detect that the voltage of Key Out 0 had dropped and that the voltage of Key In 0 had risen. This would provide an input (0,0) to the processor 18. From the deflection of the C2 carbon strip the processor 18 would detect that the voltage of Key Out 1 had dropped and that the voltage of Key In 4 had risen. This would provide an input (1,4) to the processor 18.

An key combination chart is provided in Table 2. From the example given above, the combination of inputs QW, i.e., (0,0) and C2, i.e., (1,4) results in the character W. The processor 18 sends an appropriate signal to the display 16 to depict the character W.

In the exemplary embodiment, the second and third characters 32 and 36, respectively, i.e., the various letters of the keyboard 8, are generated from inputs of combinations of keys 60 and carbon strips 76, although this need not be the case. The first characters 28, i.e., the digits and symbols of the keyboard 8, are generated from inputs of combinations of the key 60 on which the digit or symbol appears and the ALT key 62, although this need not be the case. Various configurations of Key In and Key Out, as well as the key combination, can be employed without departing from the concept of the invention.

TABLE 2

| | \multicolumn{7}{c}{Key combinations} |
|---|---|---|---|---|---|---|---|
| | C1 | C2 | C3 | C4 | C5 | C6 | ALT |
| QW | Q | W | | | | | ! |
| ER | | E | R | | | | 1 |
| TY | | | T | Y | | | 2 |
| UI | | | | U | I | | 3 |
| OP | | | | | O | P | . |
| AS | A | S | | | | | ? |
| DF | | D | F | | | | 4 |
| GH | | | G | H | | | 5 |
| JK | | | | J | K | | 6 |
| L | | | | | L | L | , |
| ZX | Z | X | | | | | SYM |
| CV | | C | V | | | | 7 |
| BN | | | B | N | | | 8 |
| M | | | | M | M | | 9 |
| Backspace | | | | | | | DEL |
| NEXT | | | | | | | * |
| Space | | | | | | | 0 |
| CAP | | | | | | | # |

Another example, for which sample keying and key combination charts have not been provided, would include a situation in which the actuation of a single key 60 to the first terminal position would result in an input to the processor 18 which the processor 18 would recognize as the first character 28 disposed at the center of the key 60. When one of the keys 60 is pressed to the first terminal position, the processor 18 would recognize the action as the input of the first character 28 without the need to press additional keys, such as the ALT key 62. Furthermore, such a key 60 could additionally include a fourth character 24 disposed at the center of the key 60 which, when combined with the ALT key 62, could be recognized by the processor 18 as a different fourth input.

The improved keyboard 8 can be employed in numerous different advantageous fashions with the handheld electronic device 4. For instance, and as depicted herein, the second and third characters 32 and 36, respectively, (FIG. 2) can be letters that together form a QWERTY keyboard, and the first characters 28 can be digits and the other symbols found on a typical keyboard. The software 20 potentially could provide a predictive text function which reviews a user's inputs from the keyboard 8 and corrects errors (e.g., without limitation, spelling and/or grammar errors), such as if the first character 28 is pressed instead of the second character 32, then the software 20 concludes that the second character 32 was desired to have been input.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A keyboard structured to be incorporated into an electronic device, the keyboard comprising:
   a printed circuit board having a plurality of electrical contacts;
   a primary conductor portion including a number of primary conductors, each one of said primary conductors being elastically deflectable between a relaxed position and a deflected position, each one of said primary conductors in the deflected position electrically connecting together a pair of the electrical contacts;
   a secondary conductor portion including a number of secondary conductors, each one of said secondary conductors being elastically deflectable between a relaxed position and a deflected position, each one of said secondary conductors in the deflected position electrically connecting together a pair of the electrical contacts;
   a number of keys, each one of said keys being cooperable with a corresponding one of said primary conductors and at least a first corresponding one of said secondary conductors;
   the primary conductors and the secondary conductors being disposed between the printed circuit board and the keys; and
   each one of said keys being movable between an initial position, a first terminal position, and a second terminal position, said each one of said keys in the first terminal position deflecting the corresponding one of said primary conductors to its deflected position, said each one of said keys in the second terminal position deflecting the corresponding one of said primary conductors and said at least a first corresponding one of said secondary conductors to their deflected positions.

2. The keyboard of claim 1 wherein each one of said secondary conductors extends adjacent a plurality of the primary conductors and is said at least a first corresponding one of said secondary conductors for the keys with which said plurality of the primary conductors correspond.

3. The keyboard of claim 2 wherein each one of said primary conductors is a dome, and each one of said secondary conductors is an elongated conductive carbon strip.

4. The keyboard of claim 1 wherein each one of said secondary conductors extends between a pair of the primary conductors and is said at least a first corresponding one of said secondary conductors for the keys with which said pair of the primary conductors are associated.

5. The keyboard of claim 1 wherein each one of said primary conductors is a dome, and each one of said secondary conductors is an elongated conductive carbon strip, the primary conductor portion including a dome panel on which the domes are disposed, the secondary conductor portion including a support sheet on which the conductive carbon strips are disposed, the support sheet having a number of primary holes formed therein, the support sheet being disposed between the printed circuit board and the dome panel, the domes being at least partially receivable through the primary holes.

6. The keyboard of claim 5 wherein the secondary conductor portion includes a spacer disposed between the support sheet and the printed circuit board, the spacer having a number of primary holes formed therein and a number of elongated secondary holes formed therein, the domes being at least partially receivable through the primary holes of the spacer, the elongated conductive carbon strips in the deflected position being at least partially receivable through the secondary holes of the spacer.

7. The keyboard of claim 1 wherein each one of said keys is cooperable with a second corresponding one of said secondary conductors and is movable to a third terminal position, said each one of said keys in the third terminal position deflecting the corresponding one of said primary conductors and said second corresponding one of said secondary conductors to their deflected positions, said each one of said keys in the second terminal position being pivoted in a first direction away from the first terminal position, said each one of said keys in the third terminal position being pivoted in a second, different direction away from the first terminal position.

8. The keyboard of claim 7 wherein each one of said keys includes a finger plate, a first protrusion, a second protrusion, and a third protrusion, the first, second, and third protrusions being disposed on and protruding outwardly from the finger plate, wherein when said each one of said keys is in the first terminal position the first protrusion is operatively engaged with the corresponding one of said primary conductors, wherein when said each one of said keys is in the second terminal position the first protrusion is operatively engaged with the corresponding one of said primary conductors and the second protrusion is operatively engaged with the at least a first corresponding secondary conductor, and wherein when said each one of said keys is in the third terminal position the first protrusion is operatively engaged with the corresponding one of said primary conductors and the third protrusion is operatively engaged with the second corresponding one of said secondary conductors.

9. The keyboard of claim 8 wherein the finger plate includes a first character disposed generally centrally thereon, a second character disposed at one end thereof, and a third character at another end thereof, the first character corresponding with the first terminal position, the second character corresponding with the second terminal position, and the third character corresponding with the third terminal position.

10. The keyboard of claim 8 wherein the finger plate includes a first character at one end thereof and a second character at another end thereof, at least a portion of the first and second characters of the keys together being arranged in a QWERTY configuration.

11. A handheld electronic device comprising:
  a keyboard;
  a display positioned adjacent the keyboard;
  a processor structured to receive inputs from the keyboard and to output to the display as a function of said inputs;
  the keyboard including a printed circuit board, a primary conductor portion, a secondary conductor portion, and a number of keys;
  the printed circuit board having a plurality of electrical contacts;
  the primary conductor portion including a number of primary conductors, each one of said primary conductors being elastically deflectable between a relaxed position and a deflected position, each one of said primary conductors in the deflected position electrically connecting together a pair of the electrical contacts;
  the secondary conductor portion including a number of secondary conductors, each one of said secondary conductors being elastically deflectable between a relaxed position and a deflected position, each one of said secondary conductors in the deflected position electrically connecting together a pair of the electrical contacts;
  each one of said keys being cooperable with a corresponding one of said primary conductors and at least a first corresponding one of said secondary conductors;
  the primary conductors and the secondary conductors being disposed between the printed circuit board and the keys; and
  each one of said keys being movable between an initial position, a first terminal position, and a second terminal position, said each one of said keys in the first terminal position deflecting the corresponding one of said primary conductors to its deflected position, said each one of said keys in the second terminal position deflecting the corresponding one of said primary conductors and said at least a first corresponding one of said secondary conductors to their deflected positions.

12. The handheld electronic device of claim 11 wherein each one of said secondary conductors extends adjacent a plurality of the primary conductors and is said at least a first corresponding secondary conductor for the keys with which said plurality of primary conductors are associated.

13. The handheld electronic device of claim 12 wherein each one of said primary conductors is a dome, and each one of said secondary conductors is an elongated conductive carbon strip.

14. The handheld electronic device of claim 11 wherein each one of said secondary conductors extends between a pair of the primary conductors and is said at least a first corresponding one of said secondary conductors for the keys with which said pair of primary conductors are associated.

15. The handheld electronic device of claim 11 wherein each one of said primary conductors is a dome, and each one of said secondary conductors is an elongated conductive carbon strip, the primary conductor portion including a dome panel on which the domes are disposed, the secondary conductor portion including a support sheet on which the conductive carbon strips are disposed, the support sheet having a number of primary holes formed therein, the support sheet being disposed between the printed circuit board and the dome panel, the domes being at least partially receivable through the primary holes.

16. The handheld electronic device of claim 15 wherein the secondary conductor portion includes a spacer disposed between the support sheet and the printed circuit board, the spacer having a number of primary holes formed therein and a number of elongated secondary holes formed therein, the domes being at least partially receivable through the primary holes of the spacer, the elongated conductive carbon strips in the deflected position being at least partially receivable through the secondary holes of the spacer.

17. The handheld electronic device of claim 11 wherein each one of said keys is cooperable with a second corresponding one of said secondary conductors and is movable to a third terminal position, said each one of said keys in the third terminal position deflecting the corresponding one of said primary conductors and the second corresponding one of said secondary conductors to their deflected positions, said each one of said keys in the second terminal position being pivoted in a first direction away from the first terminal position, said each one of said keys in the third terminal position being pivoted in a second, different direction away from the first terminal position.

18. The handheld electronic device of claim 17 wherein each one of said keys includes a finger plate, a first protrusion, a second protrusion, and a third protrusion, the first, second, and third protrusions being disposed on and protruding outwardly from the finger plate, wherein when said each one of said keys is in the first terminal position the first protrusion is operatively engaged with the corresponding one of the primary conductors, wherein when said each one of said keys is in the second terminal position the first protrusion is operatively engaged with the corresponding one of said primary conductors and the second protrusion is operatively engaged with the at least a first corresponding one of said secondary conductors, and wherein when said each one of said keys is in the third terminal position the first protrusion is operatively engaged with the corresponding one of said primary conductors and the third protrusion is operatively engaged with the second corresponding one of said secondary conductors.

19. The handheld electronic device of claim 18 wherein the finger plate includes a first character disposed generally centrally thereon, a second character disposed at one end thereof, and a third character at another end thereof, the first character corresponding with the first terminal position, the second character corresponding with the second terminal position, and the third character corresponding with the third terminal position.

20. The handheld electronic device of claim 18 wherein the finger plate includes a character at one end thereof and another character at another end thereof, at least a portion of the characters of the keys together being arranged in a QWERTY configuration.

* * * * *